Patented Mar. 28, 1939

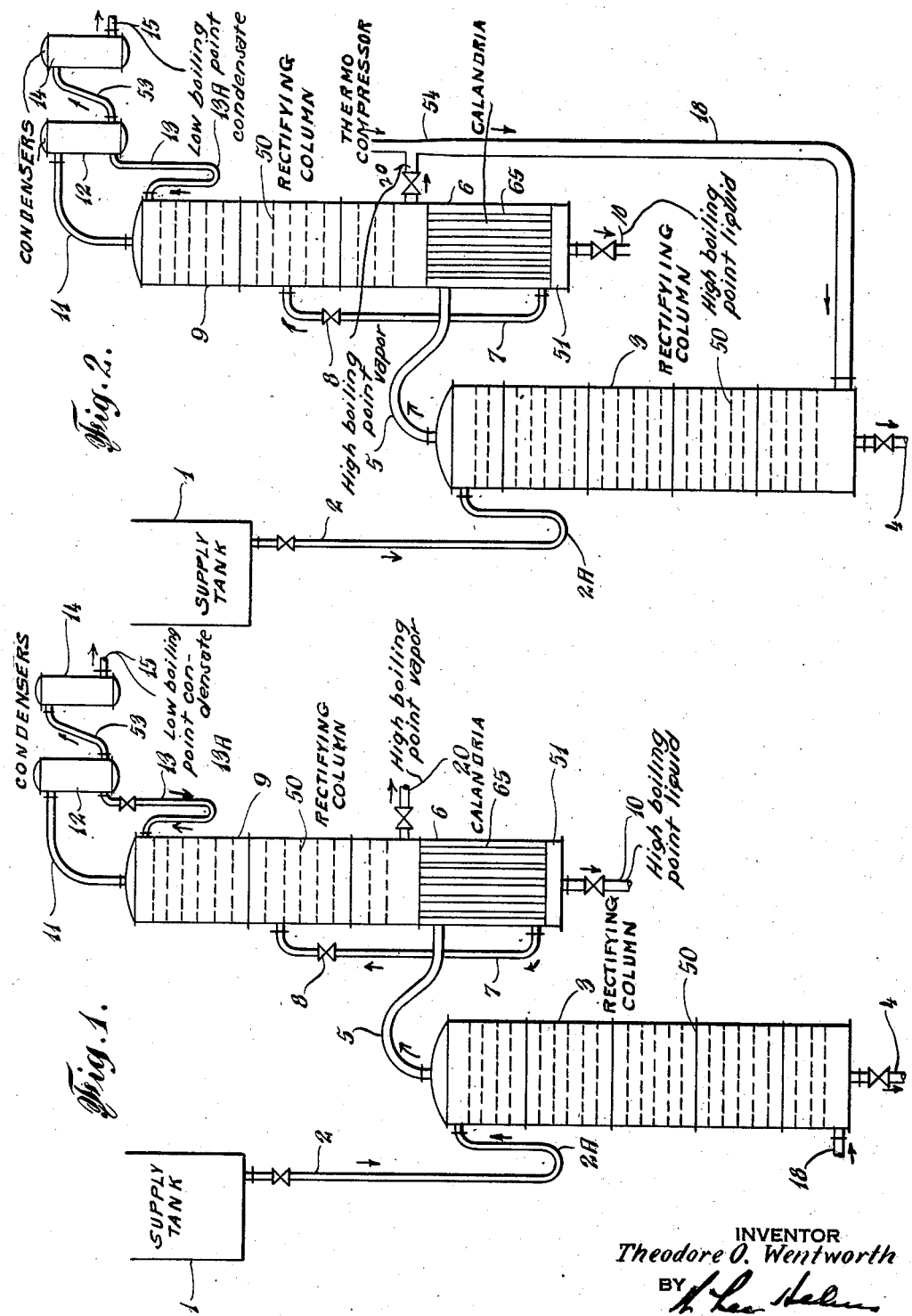

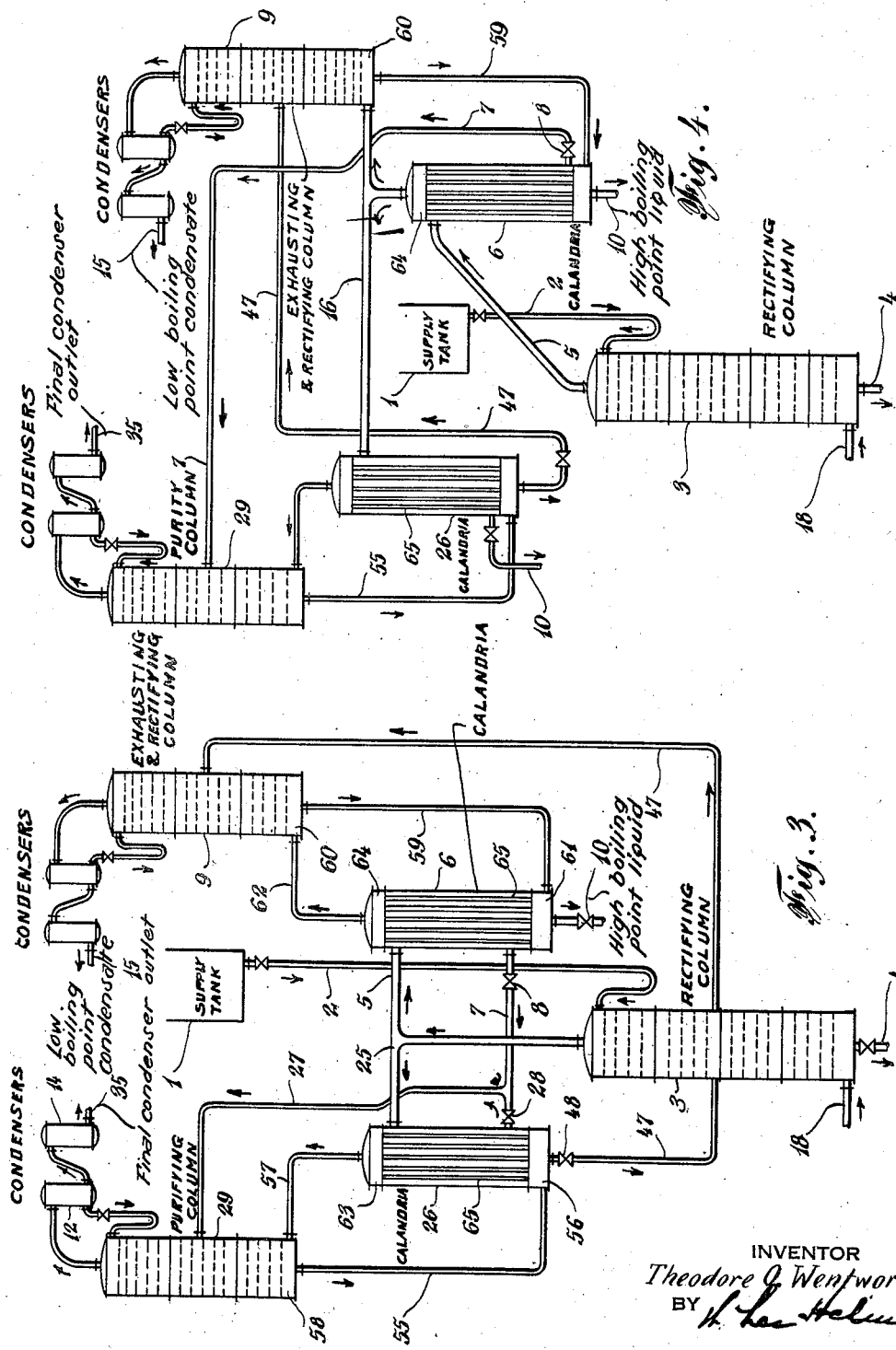

2,152,164

UNITED STATES PATENT OFFICE 2,152,164

DISTILLATION PROCESS

Theodore O. Wentworth, Cincinnati, Ohio

Application May 13, 1935, Serial No. 21,186

13 Claims. (Cl. 202—73)

This invention relates to a process and apparatus for distillation. Its primary object is to make more efficient and economical the separation of a mixture of two volatile liquids. A secondary object is to provide a distilling column or combination of columns which are more efficient, considered as a heat engine, than those known heretofore. Another object is to provide a process and apparatus well adapted to the separation of a liquid mixture in which the higher boiling constituent (especially water) is present in considerable excess. Such mixtures may be separated more efficiently and economically by the use of my process and apparatus than has been possible heretofore and the separation can be accomplished with smaller distilling columns and with less water used as a cooling medium. In some cases I may dispense with cooling water entirely. Other objects and advantages will be evident to those skilled in the art from the following disclosure.

Briefly stated, the essence of my process invention consists in first making a preliminary rough separation of the two liquids into two bodies, one of which is the pure or nearly pure higher boiling liquid and the other of which is a vaporous mixture of the two liquids which is rich in the lower boiling one. This vaporous mixture is then caused to react thermally upon itself to separate its components in a different space or column operating at a relatively lower pressure and temperature than that of the first separating column or zone. The relatively higher pressure and temperature of the vapors issuing from the first zone enables the vaporous heat to be used to accomplish their further and substantially complete separation in the second zone. This partial separation of the two liquids in a primary high pressure stage and then more completely in a secondary low pressure stage, while not a "double effect operation" as that term is understood by those in the art, allows the reuse of a large amount of the heat used, and greatly reduces the total supplied.

Many examples of pairs of liquids in which the more volatile liquid is present in relatively small amount are met in industrial processes. One of these is the beer in alcohol production which usually contains about fifteen times as much water as alcohol. Another is methyl alcohol or acetone (or mixtures of the two) which are recovered by water washing of the vapors in air in various solvent recovery systems. The resulting aqueous solution may have to be as dilute as forty to fifty parts of water for one part of acetone, in order to remove efficiently the vapors of the latter from the air.

The rectification of the alcohol in the first example, or of the acetone in the second, from the water requires the expenditure of considerable heat because of the diluteness of the solution. A distilling and rectifying column may be regarded as a heat engine having a very poor thermal efficiency when separating a very dilute solution such as these which are in question. It is necessary to distill so much of the mixture, even with a theoretically perfect column, in order to remove all of the solvent. Thus with a 2½% solution of acetone in water, although the vapors arising are comparatively strong—about 40% acetone—there would necessarily have to be distilled 60% water or 1½ times as much water as acetone. As the solution becomes progressively weaker, it is necessary to distill a much larger amount. Hausbrand (Principles and Practice of Industrial Distillation) shows that to obtain one kilogram of acetone of 99.75% purity from an acetone mixture of 2% requires almost a thousand kilogram calories in the rectifying column, while to obtain the 99.75% acetone from 40% liquid requires in the rectifying column only a little over fifty kilogram calories. This large expenditure of heat, shown theoretically by Hausbrand, is borne out in actual practice; and in the recovery of acetone from a 2½% solution in water coming for solvent recovery operations, an amount of liquid is returned as wash to the head of the column equivalent to as much as nine times the product obtained. The reflux wash in an efficient column which separates practically pure acetone from a 40% feed as is done in my process may, on the contrary, be less than one part for each part of product.

It is well known to economize on the use of heat in distillation by utilizing the vapors from one column still to supply heat to a successive column still or stills in the same fashion as the more familiar multiple effect evaporator.

Gallingaert (Chemical & Metallurgical Engineering, vol. 32, p. 362) illustrates this utilization of distillation in multiple effect, but there are several disadvantages to the practical utilization of this method. Reich, U. S. Patent No. 1,599,185, illustrates another multiple effect system in which successive effects operate as plates in the usual exhausting column—each being under progressively higher vacuum. A disadvantage here is that the usual exhausting column uses from ten to fifteen sections to reduce the alcohol in the slops to a practical zero, and this number of "effects" in the evaporation would also be required. So many could not be practically built into a multiple effect evaporator.

Referring now to the accompanying drawings, these are more or less diagrammatic because the units thereof are standard and well-known apparatus. The invention as regards apparatus lies in the new combination of such standard units by which the new technical effect can be obtained:

Fig. 1 is a side elevation of the simplest form of my apparatus combination.

Fig. 2 is identical with Fig. 1, except that a thermo-compressor has been added.

Fig. 3 is a side elevation of the form of the apparatus which is adapted to the separation of a three-component liquid mixture; for instance, alcohol, light boiling substances mostly of an aldehydric character, technically called "heads", and water.

Fig. 4 is another form of my apparatus usable to separate a three-component liquid mixture. This form is advantageous for use in certain applications hereinafter to be discussed. The view is also a side elevation.

Throughout the above figures, like numbers have been used to designate like parts.

Describing now Fig. 1, numeral 1 indicates a supply tank of the two component or binary mixtures to be separated. Numeral 2 is a valved pipe having a U-bend or trap 2a, while 3, with which the pipe connects, is a conventional rectifying column provided interiorly with either baffle plates or bubble cap trays 50. Pipe 18 at the lower end of the column is an inlet for the admission of live steam, while valved pipe 4, also at the lower end of column 3, is provided for the discharge of the higher boiling liquid (usually water).

From the top of column 3 a vapor-pipe 5 extends to a calandria or heat exchanger 6 containing a tube nest 65 in the bottom of column 9 in such a manner that the vapor entering through pipe 5 will be inside of the calandria 6 and in indirect heat exchange relation with liquid from column 9 inside tubes in tube-nest 65. Calandria 6 may be a separate unit or it may be constructed as the lower end of column 9 as shown. There is a free space 51 below the tubes in the calandria as is usual practice. A valved-pipe 10 extends from the bottom of the calandria 6 for the discharge of the higher boiling liquid.

From the lower part of calandria 6 there extends from the interior thereof a pipe 7 outwardly and then upwardly parallel to the column and then again into the column at some point between intermediary plates 50 of the column. The relative height of this entrance of pipe 7 is chosen depending on the nature of the mixture being separated, as is well known to those in the art. Near the bottom of the rectifying part of this column 9 there is a horizontal valved-pipe 20 which is an outlet pipe for substantially pure vapors of the higher boiling liquid, usually steam.

The top of column 9 is provided with the usual condensers 12 and 14, connected in series with the column by a pipe 11 and with each other by a pipe 53. A valved-pipe 13 having a U-bend or trap 13a is arranged to permit return of the liquid from the bottom of dephlegmator-condenser 12 to the top of rectifying column 9.

Fig. 2 is identical with Fig. 1 except that at the end of the pipe 20 there is a steam injector 54 carrying pressure steam, arranged to entrain vapors delivered by pipe 20 and impart to them a higher temperature and pressure potential. The vapors so heated and compressed are run to steam-delivery pipe 18, shown in Fig. 2 as now on the right-hand side of column 3 and delivered into the base of that column. The only source of heat for the operation of the apparatus of Fig. 2 is, therefore, the pressure steam which compresses the low pressure steam in the steam injector 54.

In Fig. 3, column 3 has the same structure as in Figs 1 and 2, however, the vapor delivery pipe 5 is provided with a branch 25, forming a T. On each side of column 3 there is a calandria, 26 to the left and 6 to the right, to the interior of which the ends of the T are connected. To the left and above calandria 26 there is a purifying column 29 and to the right and above calandria 6 there is an exhausting and rectifying column 9. Columns 29 and 9 with their condensers are structurally the same as the column 9 of Figs. 1 and 2 except that they contain no calandrias. (The calandrias can be built into the lower ends of these respective columns as shown in Fig. 1, if this is desirable.)

In Fig. 3 the bottom of column 29 is connected by a pipe 55 carrying liquid to a free space 56 in the bottom of calandria 26 while a free space 63 at the top of the latter is connected by a vapor-pipe 57 to a free space 58 in the bottom of column 29. The arrangement as regards column 9 is similar—pipe 59 connecting free space 60 of column 9 with free space 61 at the bottom of calandria 6. Pipe 62 connects a free space 64 at the top of calandria 6 with the free space 60 at the bottom of column 9.

The lighter boiling components separated respectively by columns 29 and 9 are drawn off in streams from final condensers 35 and 15. The bottom of the free space 56 of calandria 26 is connected to the middle of column 9 by a pipe 47 in which there is a valve 48.

The interiors of the heating chambers of both calandrias are connected by a pipe 7 in which there are valves 28 and 8. Connecting with pipe 7 at a point between the valves is a pipe 27 which connects to the middle of column 29. A discharge pipe 10 extends downward from the bottom of calandria 6.

In Fig. 4 the elements are the same as in Fig. 3 but the arrangement is slightly different. Column 3 is connected by vapor-pipe 5 to the top of the heating chamber of calandria 6. Pipes 55, 47, 59 and 10 have the same connections as in Fig. 3, but pipe 7 connects the bottom interior of the heating chamber 65 of calandria 6 with the middle interior of column 29. Calandria 6 is provided at its top with a T-shaped vapor-pipe 16 which connects free space 64 with free space 60 at the bottom of column 9 and the top interior of the tube nest 65 within the calandria 26.

Referring now again to Fig. 1, the operation of this apparatus to carry out my process will be described as it should occur in the separation of acetone from a dilute water solution:

*Example 1*

A solution of 2½% actone in 97½% water is run from the supply tank 1 through the valved line 2 to the top plate of the column 3 which is maintained under a pressure of 50 lbs. per square inch. This column is supplied with heat at the base, either as "open" steam, as shown, in which case steam is simply discharged into the base, or as "closed" steam in a closed coil or calandria in which the heat is obtained in indirect heat transfer relationship. Sufficient heat is supplied in one of these ways to exhaust completely all of the acetone from the liquid as it descends from plate to plate. The spent water is discharged from 4 through the usual trap. The large amount of water present in the feed supplies all of the reflux wash required in this exhausting column, and the vapors at the top are in substantial equilibrium with the feed. The vapors arising from a 2½% acetone solution contain approximately 40% acetone, and are passed from this column under a pressure of approximately 50 lbs. per square inch, to the heating chamber or tube nest 65 of calandria 6 at the base of column 9. By reason of their high pressure and temperature, they pass heat to the liquid in the base of this column, and in doing so are condensed. The condensate so formed, 40% acetone, (containing only 1½ pounds water per pound acetone as compared to 39 pounds water per pound acetone in the original feed) is passed through a reducing valve 8 in the pipe 7 to some intermediary section of the column 9 into which it expands and vapor "flashes". Column 9 is fitted with the usual condensers at the top and accomplishes the rectification into substantially pure acetone at the top, and substantially pure water at the bottom, in the usual manner. Only about two parts of acetone must be returned to the head of the column per part of pure acetone drawn off as a product, and the amount of heat required, which is ultimately rejected in the condensers, is considerably less than that available in the vapors passing into 6. This excess heat may be withdrawn from the column base as vapor in equilibrium with the waste withdrawn from pipe 10. Since the exhausting action of the column has produced a very nearly perfect separation, and the waste is thus substantially pure water, the vapors leaving by pipe 20 are substantially pure steam, and at a pressure corresponding to the pressure required to operate the column—or in the usual case, not over 5 lbs. per sqaure inch gauge. This low pressure steam may be used for other purposes such as, for example, the operation of another column accomplishing the same separation in the usual manner.

Example 2

In a second arrangement shown in Fig. 2 of the drawings, those vapors formed in the calandria 6 and which are not needed for the operation of column 9 are passed to a thermo-compressor which compresses them to the pressure at the base of column 3; and by thus making available the thermal energy of these vapors at a higher level of pressure and temperature, diminishes the amount of fresh steam which must be introduced into the system for accomplishing the purpose. If a thermo-compressor of the jet type, as indicated by 54, is used, the mixture of fresh steam and recompressed vapors or steam is discharged into the base of column 3.

Example 3

As a third example may be taken the distillation of a fermented alcoholic mash or beer containing approximately 7% ethyl alcohol, most of the balance being water. The beer is fed to pressure column 3 of Figs. 1 or 2 and due to the exhausting action of the column all of the alcohol is flashed off the top plate in a vaporous mixture with water containing about 33-35% alcohol. The larger part of the water is exhausted by passing downwardly through the column and is discharged at the base substantially free of alcohol. As before, the vapors are condensed under pressure in the calandria 6, the condensate passing into the side of column 9 and being thereby separated into approximately 188 to 190 proof alcohol going out of 15 and alcohol-free water going out of pipe 10. The amount of reflux required in the column 9 is about 1.65 to 1, while usual practice for producing 188 proof requires a reflux ratio of approximately 4.3 to 1.

I have discovered that this principle of distillation may be advantageously applied not only in the simple case where a mixture of liquids is to be separated into only two fractions or constituents, but is equally advantageous for the separation of three or more fractions or components of more complicated liquid mixtures. This operation of withdrawing condensate from a pressure calandria of a column and feeding it midway of the column itself may be regarded as an advantageous unitary process which may be combined in various relationships with other distillation equipment in various processes. While many such combinations will be immediately apparent to those skilled in the art as being of substantial form and scope of my invention, two will be given here as illustrative of these many modifications.

Example 4

The production of 190 proof spirits from fermented liquors is an example of a system in which substantially three liquids are separated by rectification. Besides the water and alcohol, there are small quantities of aldehyde bodies and other materials which are more volatile than the alcohol itself, and which in Fig. 1 would be discharged with the alcohol from 15. It is necessary to separate these materials from the alcohol if pure spirit is to be obtained, and as all of these liquids have a lower boiling point than that of alcohol, they may be removed together before the alcohol itself is separated from the water.

Fig. 3 may thus be regarded as representative of a distillation system for the separation of three fractions or components—in this case, alcohol, light boiling materials or "heads" and water.

As in Example No. 2, the beer is fed into the pressure column 3 and vapors withdrawn from the top containing water, all or substantially all of the alcohol, in about a 33% mixture, and all of the heads. This mixture is passed to the two calandrias 6 and 26 which are connected respectively to the rectifying and exhausting column 9 and the purifying column 29. The condensate formed in both of these calandrias is, therefore, of the same composition and is passed through pipes 7 and 27, to the purifying column 29 which separates the heads in pipe 35. Heat for the operation of column 29 is supplied by the vapor from the dilute alcohol, still approximately 33% in water and with substantially no heads, which is boiling in the calandria 26. The dilute alcohol stripped of heads is then passed by pipe 47 to the concentrating column 9, separating the alcohol which is discharged as pure spirits, at 15 and water at 10. If some heads remain in the feed to column 9, they may be removed at 15 and the pure alcohol drawn from one of the upper plates of the column, as is standard practice; and higher boiling alcohols or fusel oil may be drawn from one of the lower plates and separated as is common in the art; both of these details are old and not primarily concerned with my invention.

Example 5

I have also discovered that it is possible to make a three component separation using the arrangement shown in Fig. 4 which has certain advantages for some cases. In Example 5, all of the vapors from the pressure column 3 are condensed in the single calandria 6 and the 33% alcohol solution containing heads is passed to the purifying column 29, and after the heads are removed, the 33% alcohol solution is passed from the base of 29 through line 47 to column 9 at the top of which approximately 190 proof alcohol collects, and at the bottom of which is water. The water boiling in calandria 6 supplies steam directly for the operation of column 9 and also supplies heating steam which is condensed in calandria 26 to boil the 33% alcohol contained therein, and for the supply of vapors to the refining column 29. The boiling point of a 33% solution of alcohol in water is approximately 84° C., while the temperature of the water vapor is approximately 100° C. Thus, advantage may be taken of the difference of the boiling points of water and of an aqueous alcohol solution to provide the temperature difference necessary for the transfer of heat in calandria 26, and operation of column 29.

It will also be apparent to those familiar with the art that a plurality of systems such as Fig. 1 might be combined in series, with the pipe 20 connected to a successive unit operating at a lower pressure and supplying heat in such a relation as the pipe 18, a combination of two or more operating at various super atmospheric or subatmospheric pressures would thus be formed which would separate either the same or different pairs or complexes of volatile liquids. Thus the higher pressure column of a second pair of distilling columns may receive the excess vapors of the less volatile liquid not required for the rectifying action in the initial lower pressure column, and the second pair of distilling columns may operate at absolute pressures relatively lower than the initial high and lower pressure columns. Furthermore, additional series of distilling columns may be employed similar to those illustrated in Fig. 1 so that the operation of passing vapors progressively of less volatile component as heating vapor may be continued in progressively lower pressure pairs of distilling columns until the maximum number of said pairs has been reached.

I have found that all of the advantages of my invention may be realized by the combination of various pieces of distillation equipment of standard construction and design—the novelty resides entirely in the combination thereof. The figures show only the essential features of distillation systems using my invention, and other standard accessories, useful for the operation, are not shown.

In particular, heat interchangers for recovery of heat from waste slops and from vapors passing off the columns are not shown. Such devices are most important for the economical operation of distillation systems, and are old in the art for preheating the feed liquors with the heat which would otherwise be wasted in the slops or in condenser water. I have found it highly advantageous to use the heat in the slops and in the condenser water, and in practice, using Fig. 1 as an example, would pass the feed from tank 1 through the water side of condenser 14 and dephlegmator condenser 12 and thence through a counter-current heat interchanger which absorbs the heat passing out into the waste 4, and thence into the top plate of column 3.

By the use of the condensers as preheaters, I have found that, usually, in the operation of separating dilute aqueous solutions of a lower boiling solvent, with my invention, the amount of heat which may be absorbed by the solvent aqueous feed solution in the condensers is more than the amount of heat which must necessarily be dissipated there in condensation of reflux and product streams. This advantage I find to be a corollary of the relatively small amount of reflux condensation required as compared to earlier practice. No additional refrigeration in the form of cooling water is thus required—which in the usual process represents a considerable item. This is particularly advantageous in those locations where cooling water is not cheaply available in large quantities.

Still another feature of my invention is the application to the separation of homologous series of organic liquids, notably petroleum and its products. I have found that many distilling operations accomplished by the usual bubble tower in the handling of petroleum fractions may be done more economically by my process than by those heretofore used.

I have found that the size of the distilling columns required for handling a given amount of liquids may be considerably reduced by the use of my invention. In the Example No. 1 above for the separation of acetone from a 2½% solution in water, usual practice requires the vaporization of 9 parts acetone which is passed off the top, condensed, and refluxed for each one part drawn off as product—or a total of ten parts, while I have found that my method requires only 2 parts reflux for each one part product—or a total of three parts. It is thus apparent that by the use of my invention I am able to secure the same capacity with a distilling capacity—or column-size—less than one-third as much as was possible heretofore.

In the practice of my invention, the first or pressure distillation may be accomplished by some vapor other than steam; for instance, mercury vapor, or in some cases diphenyloxide vapor. The distillation may be done under any pressure ranging from 5 lbs. per square inch to 200 lbs. per square inch or the limit which is safe for the apparatus, or if desirable the first stage may be done at atmospheric pressure and the second at any desired subatmospheric pressure.

Having described my invention, what I claim and desire to secure by Letters Patent, is as follows:

1. The process of separating two volatile liquids from a mixture thereof which comprises feeding the liquid mixture into the top of an exhausting column operating at a relatively high pressure, passing the vapors into a heating section at the base of a second distilling column operating at a lower pressure where said vapors condense, passing said condensate into a mid-section of said lower pressure distilling column, withdrawing the less volatile liquid substantially free of the more volatile liquid continuously from the lowest sections of both said higher pressure column and said lower pressure column, and withdrawing the excess vapors of the less volatile liquid, not required for the rectifying action in the said lower pressure column from the base of said lower pressure column for external use as a heating or power medium.

2. The process of separating two volatile liquids from a mixture thereof which comprises feeding the liquid mixture into the top of an exhausting column operating at a relatively high pressure, discharging the vapors into the heating section at the base of a second distilling column operating at a lower pressure where said vapors condense, discharging said condensate from the base into a mid-section of said lower pressure distilling column, withdrawing the less volatile liquid substantially free of the more volatile liquid continuously from the lowest sections of both said higher pressure column and said lower pressure column, withdrawing the excess vapors of the less volatile liquid, not required for the rectifying action in the said lower pressure column, from the base of said lower pressure column, passing said excess vapors to the base of the high pressure column of a second identical pair of distilling columns, said second pair of distilling columns operating at absolute pressures relatively lower than said high and lower pressure columns, and continuing said operation of passing vapors of less volatile component as heating vapor in progressively lower pressure pairs of distilling columns.

3. The process of separating two volatile liquids from a mixture thereof, which comprises feeding the mixture of said liquids into the top of an exhausting column operating at a relatively high pressure, passing the vapors into the heating section at the base of a second distilling column operating at a lower pressure where said vapors condense, discharging said condensate from the base into a mid-section of said lower pressure distilling column, withdrawing the less volatile liquid substantially free of the more volatile liquid continuously from the lowest sections of both said higher pressure column and said lower pressure column, withdrawing the excess vapors of the less volatile liquid, not required for the rectifying action in the said lower pressure column, from the base of said lower pressure column, passing said vapors to a compressor, compressing said vapors to the pressure of said higher pressure column, and passing said compressed vapors into the base of said higher pressure column to be used as a heat supply for said higher pressure column.

4. A process in accordance with claim 3, in which the less volatile liquid is water and the vapor from the base of said low pressure column is steam, said vapor is thermo-compressed by a jet or mechanical compressor driven by pressure steam, and the mixture of pressure steam and compressed vapors is supplied to the base of the said pressure distilling column as a heat supply.

5. A process in accordance with claim 1, in which the mixture is a binary liquid mixture, whose less volatile component is water and whose more volatile component is any liquid having a lower boiling point than water and being partially or substantially completely miscible with water in all proportions.

6. In the process of separating one volatile liquid from another by distillation and rectification, the feeding of the mixture of liquid to be distilled and separated through condensers and slop heat interchangers, thence into the top of a distilling column, passing said liquid mixture downwardly through said distilling column and discharging it at the base substantially completely exhausted of the more volatile component, removing substantially all of the more volatile liquid from top of said exhausting column in a vaporous mixture with part of the less volatile component, said mixture being substantially that one which would be in equilibrium with the liquid feed, condensing said vaporous mixture on the heating surfaces of a calandria supplying heat to a second distilling column operating at a lower absolute pressure than said first column, passing condensate so formed as liquid and/or vaporous feed to an intermediate part of said second column, separating said liquid and/or vaporous feed into its more volatile and less volatile constituents by rectification in said second distilling column, condensing part of said more volatile constituent in dephlegmator condenser placed above the top and rectifying section of said second column and returning condensate so formed to said second column as reflux wash, condensing the balance of said more volatile constituent substantially pure, withdrawing said less volatile constituent substantially pure, withdrawing said less volatile constituent as distilling slop from the lowest part of the exhausting section or of the calandria of said second distilling column substantially free of more volatile constituent, and passing off surplus steam so formed in said calandria by action of condensation of vapors on said surface of calandria to be used in other processes.

7. In the separation by distillation and rectification of a ternary mixture of volatile liquids, or in the separation of a mixture of a plurality of volatile liquids into three parts according to respective volatility, the process which comprises the feeding of the mixture into the top plate of a relatively high pressure column, the withdrawal of a vapor mixture from the top of said pressure column, the division and passing of said vapor mixture into the heating belts of two relatively lower pressure distilling columns, the collection and passing of the condensate so formed into a mid-section of one of said lower pressure columns, and the removal of the most volatile material thereby, the discharge of the liquid collecting in the base of said first low pressure column into a mid-section of the second low pressure column and the separation of the fraction of intermediate volatility thereby, and the discharge from the base of said second low pressure column, and said high pressure column, of the least volatile component.

8. A process in accordance with claim 7, in which a mixture of volatile liquids, more than three, are separated in a system comprising one relatively high pressure column supplying vapors to the heating belts of a plurality of relative lower pressure columns, one less in number than the total number of fractions to be separated, collecting condensate from all of these heating belts and passing the same to the first of the low pressure columns, removing the components of the original mixture by successive columns in order of decreasing volatility, passing liquids from the base of each low pressure column to successive low pressure columns, and discharging the least volatile liquid from the base of the last lower pressure column, and from the base of said higher pressure column.

9. The separation by the process as described in claim 7, of a mixture of ethyl alcohol, water, and impurities usually encountered therein, said mixture coming from the fermentation of grain, or of molasses, or of other carbohydrate containing material, or from synthetic processes for the manufacture of ethyl alcohol or of spirituous beverages in which the aldehydes, "heads", or other light boiling liquids are removed in one or more lower pressure columns, and the ethyl alcohol is separated at the top of the next to the last of said lower boiling columns, the higher alcohol oils being drawn off the top of the final lower pressure column in a so-called azeotropic distillation, and in a vapor mixture with water, the vapor mixture condensed, the condensate decanted in two layers of alcohol oils and water, the water layer returned as reflux wash to the head of said final low pressure column, and the alcohol oils drawn off.

10. In the separation by distillation and rectification of a ternary mixture of volatile liquids, or a mixture of a plurality of volatile liquids into three parts according to respective volatility, the process which comprises the feeding of the mixture into the top plate of a relatively high pressure column, the withdrawal of a vapor mixture from the top of said pressure column, passing the said vapor mixture into the vapor passages of an evaporator or calandria, supplied on the liquid side with liquid from the base of a final lower pressure distilling column, evaporating said liquid by the heat of said pressure vapors, dividing the lower pressure vapors into two streams, one passing to the base of said final lower pressure column, the other passing to the heating belt of the initial lower pressure column, removing the condensate formed from the pressure vapors in said evaporator or calandria, passing said condensate to a mid-section of said initial lower pressure column, rectifying and removing the most volatile component from said initial lower pressure column, discharging the liquid from the base of said initial lower pressure column into a midpoint of said final lower pressure column, rectifying and removing from the top of said final lower pressure column the fraction of intermediary volatility, and removing from the base of said final lower pressure column, and from the base of said higher pressure column, the least volatile component substantially free of the more volatile fractions.

11. The separation by the processes as described in claim 10, of a mixture of ethyl alcohol, water, and impurities usually encountered therein, said mixture coming from the fermentation of grain, or of molasses, or of other carbohydrate containing material, or from synthetic processes for the manufacture of ethyl alcohol or of spirituous beverages, in which the aldehydes, "heads", or other light boiling liquids are removed in one or more lower pressure columns, and the ethyl alcohol is separated at the top of the last of said lower pressure columns, the higher alcohol oils being drawn off from a plate nearer the base thereof.

12. The separation by the processes as described in claim 10, of a mixture of ethyl alcohol, water, and impurities usually encountered therein, said mixture coming from the fermentation of grain, or of molasses, or of other carbohydrate containing material, or from synthetic processes for the manufacture of ethyl alcohol or of spirituous beverages, in which the aldehydes, "heads", or other light boiling liquids are removed in one or more lower pressure columns, and the ethyl alcohol is separated at the top of the next to the last of said lower boiling columns, the higher alcohol oils being drawn off the top of the final lower pressure column in a so-called azeotropic distillation, and in a vapor mixture with water, the vapor mixture condensed, the condensate decanted in two layers of alcohol oils and water, the water layer returned as reflux wash to the head of said final low pressure column, and the alcohol oils drawn off.

13. The continuous process of separating a ternary solution of volatile liquids which comprises distilling said solution under substantial pressure to accomplish a preliminary approximate separation into a liquid rich in the highest-boiling constituent and a vapor rich in the lower boiling constituents, passing the latter vapor into two separate spaces in which the said vapor is placed in indirect heat exchange relation with a body of liquid rich in the highest boiling constituent and which is substantially above the condensation points of the lowest boiling liquids and slightly above the vaporizing point of the highest boiling one, whereby the vapor from the preliminary distillation is condensed, then passing the resulting distillates into a space in which the lower boiling constituent of the vapor may separate therefrom and the heavier constituents condense, removing and condensing the vapors of the lowest boiling liquid, then removing the condensate and causing it to react thermally upon itself to remove its lower boiling constituent, said thermal reaction being carried out in direct thermal contact with vapors produced in the second space in which the condensate from the preliminary distillation is kept.

THEODORE O. WENTWORTH.